US011931881B1

(12) United States Patent
O'Brien

(10) Patent No.: US 11,931,881 B1
(45) Date of Patent: Mar. 19, 2024

(54) TOOL BOX HAVING INDEXABLE STACKABLE TRAYS AND STACKABLE TRAYS THEREFOR

(71) Applicant: US Govt as Reprsented by the Secy of the Air Force, Wright Patterson, OH (US)

(72) Inventor: Courtney O'Brien, San Antonio, TX (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 17/449,467

(22) Filed: Sep. 30, 2021

(51) Int. Cl.
*B25H 3/02* (2006.01)
*B25H 3/06* (2006.01)

(52) U.S. Cl.
CPC ............... *B25H 3/026* (2013.01); *B25H 3/06* (2013.01)

(58) Field of Classification Search
CPC .......... B25H 3/022; B25H 3/026; B25H 3/06; B25H 3/02; B25B 27/00; B65D 25/10; B65D 5/503; B65D 71/70; B65D 81/3453
USPC .......................................................... 206/349
See application file for complete search history.

(56) References Cited

U.S. PATENT DOCUMENTS 5,344,022 A * 9/1994 Stahl .................... B65D 21/041 206/505
5,439,108 A * 8/1995 Lackie ................... B25H 3/023 206/499
5,503,275 A * 4/1996 Fesquet .............. B65D 21/0235 206/505
6,026,999 A 2/2000 Wakefield
6,868,967 B2 3/2005 Lam
6,971,517 B2 * 12/2005 Chen ........................ B25H 3/02 190/122
7,017,746 B2 * 3/2006 Apps ........................ B65D 1/36 220/519
10,213,913 B2 2/2019 Pang
10,618,159 B2 4/2020 Maruzzo
2012/0193260 A1 * 8/2012 Baltz .................. B65D 21/0212 206/503

FOREIGN PATENT DOCUMENTS

EP 0579158 A1 * 7/1993

OTHER PUBLICATIONS

Amazon.com, Craftsman Mechanics Tool Set, SAE / Metric, 135-Piece (CMMT12024), 2019, ASIN: B07ND1FVDP, Date First Available: Apr. 8, 2019 (Year: 2019).*

(Continued)

*Primary Examiner* — Anthony D Stashick
*Assistant Examiner* — Marcos Javier Rodriguez Molina
(74) *Attorney, Agent, or Firm* — AFMCLO/JAZ; Larry L. Huston

(57) ABSTRACT

A tool box with vertically stacked monolithic trays. Each tray has pockets specifically shaped to receive complementary tools. The trays have upstanding cantilevered posts, which can space apart the superjacent tray. Alternatively, the posts can be received in complementary sockets of superjacent trays to prevent undue lateral movement while in the tool box. The post and socket geometry can be constructed to index the order in which trays are stacked and index how individual trays are oriented for optimal and sequenced access to the tools.

8 Claims, 14 Drawing Sheets

(56) References Cited

OTHER PUBLICATIONS

Craftsman Mechanics Tool Set, SAE / Metric, 135-Piece (CMMT12024) ASIN: B07ND1FVDP Date First Available Apr. 8, 2019 Amazon.com (Year: 2019).*

Amazon.com, Craftsman Mechanics Tool Set, SAE/Metric, 135-Piece(CMMT12024),2019,ASIN:BO7ND1FVDP, DateFirst Available:Apr. 8, 2019 (Year: 2019).*

* cited by examiner

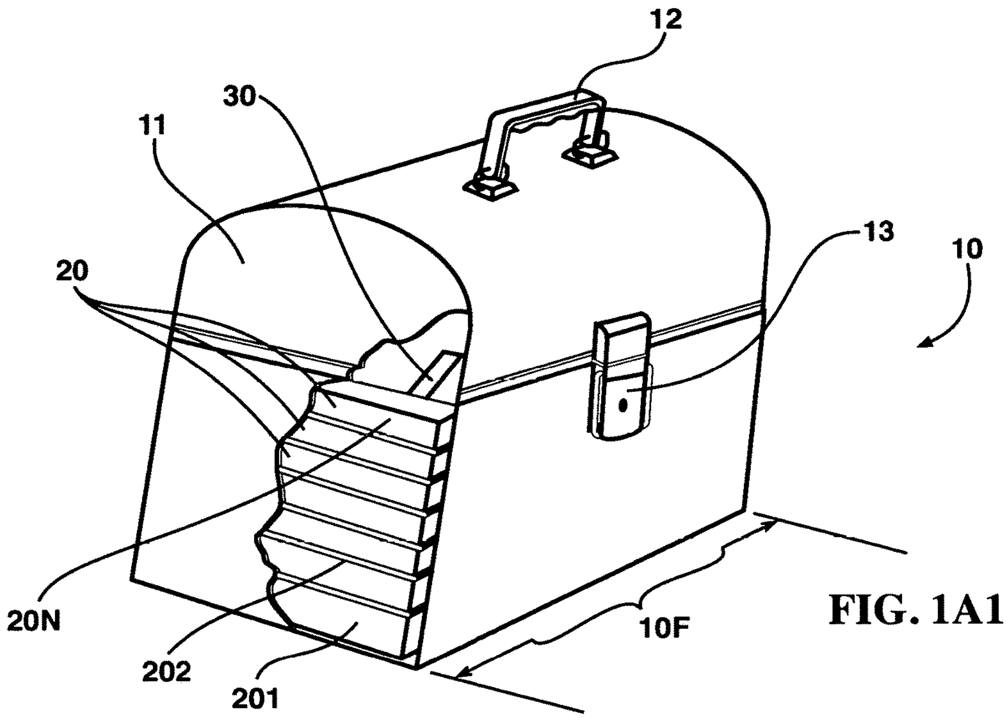
FIG. 1A1
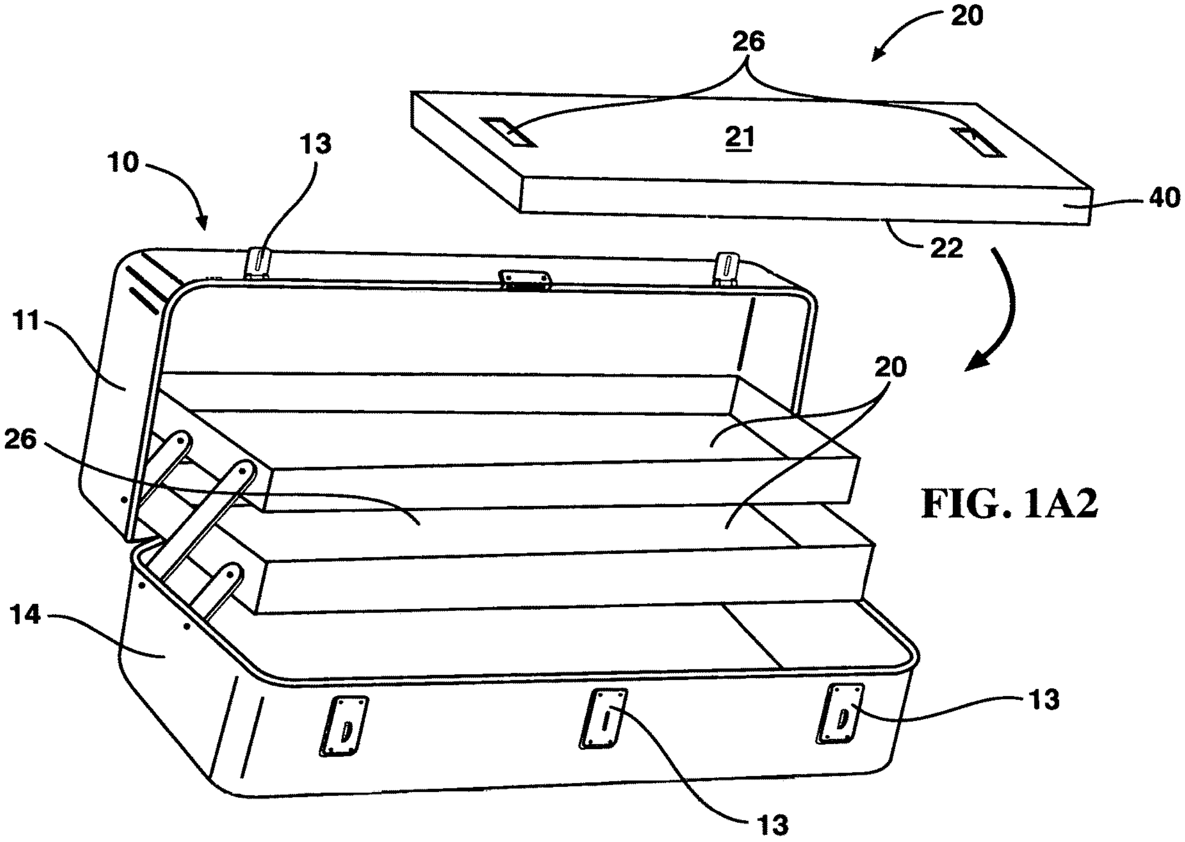
FIG. 1A2

TOOL BOX HAVING INDEXABLE STACKABLE TRAYS AND STACKABLE TRAYS THEREFOR

STATEMENT OF GOVERNMENT INTEREST

The invention described and claimed herein may be manufactured and used by or for the Government of the United States of America for all government purposes without the payment of any royalty.

FIELD OF THE INVENTION

The present invention is directed to tool boxes with stackable trays for storage of and access to tools and more particularly to such tool boxes having trays custom fitted for specific tools in predetermined and fixed positions within the tool box.

BACKGROUND OF THE INVENTION

Tool boxes have been used for years to provide portability for multiple hand tools. Portability allows the tools to be stored in a first, secure location for access by one or more technicians and then to be used on site at a second location where the maintenance occurs.

Each tool box may have plural vertically stacked trays to carry the plethora of tools required for or helpful for the task at hand. The trays are typically rectangular, as dictated by the rectangular footprint of most tool box geometries.

The trays may have an open floor pan, allowing tools to jostle against each other. But using this configuration allows tools to become damaged, if not lost or misplaced. If a tool is not accounted for at the end of aircraft maintenance, the tool is considered lost and the aircraft may be grounded. If heavy tools are stored in an open tray, the center of gravity may shift during transport, increasing the odds of an accident.

To overcome these problems, trays having pockets to receive specific tools have been used. Such trays are often made of closed cell foam, such as Kaizen foam available from Kaizen Inserts. The pockets are cut into the trays to accommodate the specific tools. But this approach has been found unsatisfactory. Such trays, despite being closed cell, still hold water, leading to rust. The trays cannot be readily stacked without either requiring undue thickness or the weight of tools in one tray to impinge upon tools in the tray below. Color coding of the trays, as required by AFI 21-101 is difficult.

Yet another problem occurs when trays jostle against one another during transport. High precision tools having tight tolerances, such as may be used for dimensional metrology, can be subject to miscalibration. And common rectangular trays are subject to being placed in the tool box in two orientations, possibly moving the center of gravity away from the center of the tool box footprint and leading to unfamiliarity with the order of usage or expected usage for a particular task. Trays may be stacked in an improper configuration, leading to confusion as to which tool is to be used in sequence.

Accordingly a new approach is needed. Preferably, the new approach provides trays which are easily sized and labeled for specific tools, stackable without undue lateral movement, indexable to a unique configuration with the toolbox and to other trays and modular to allow flexibility in arranging specific tool boxes.

SUMMARY OF THE INVENTION

In one embodiment the invention comprises a tool box for holding a plurality of hand tools. The tool box has an enclosed chamber for holding a plurality of hand tools, the chamber having a bottom and a plurality of upstanding sidewalls extending upwardly therefrom to define an opening at the top of the chamber and a lid for removably covering the opening. Inside the tool box is a plurality of N monolithic, vertically stacked trays, each of the trays defining an XY plane and a Z direction perpendicular thereto, each tray further having at least one pocket configured to securely receive a complementary hand tool therein. Each monolithic tray further has at least three posts upstanding in the Z direction. Each upstanding post can intercept a second, superjacent tray disposed above that tray whereby the second tray can rest upon the posts of first tray in succession until the top tray of the plurality of N trays is reached.

In another embodiment the invention comprises a monolithic vertically stackable three-D printed tray for receiving at least one hand tool, the tray defining an XY plane and a Z direction perpendicular thereto. The tray further has a first surface with a plurality of pockets adapted to receive respective complementary tools therein and a second surface opposed to the first surface, each pocket being configured to receive the complementary hand tool in a position generally parallel to the XY plane, each of the pockets having a mutually different geometry. The monolithic 3D printed tray further comprises a plurality of upstanding cantilevered posts, each of the posts extending in the Z direction from a proximal end integral with the XY plane portion of the first surface to a distal end remote therefrom.

BRIEF DESCRIPTION OF THE DRAWINGS

FIG. 1A1 is a perspective view of an exemplary domed tool box according to the present invention in the closed position, shown partially in cutaway to reveal seven stacked trays.

FIG. 1A2 is an exploded perspective view of the type of tool box shown in FIG. 1A1 opened to show the trays.

FIG. 2 is a perspective view of an exemplary tray according to the present invention.

DETAILED DESCRIPTION OF THE CLAIMED INVENTION

Figure 1B:
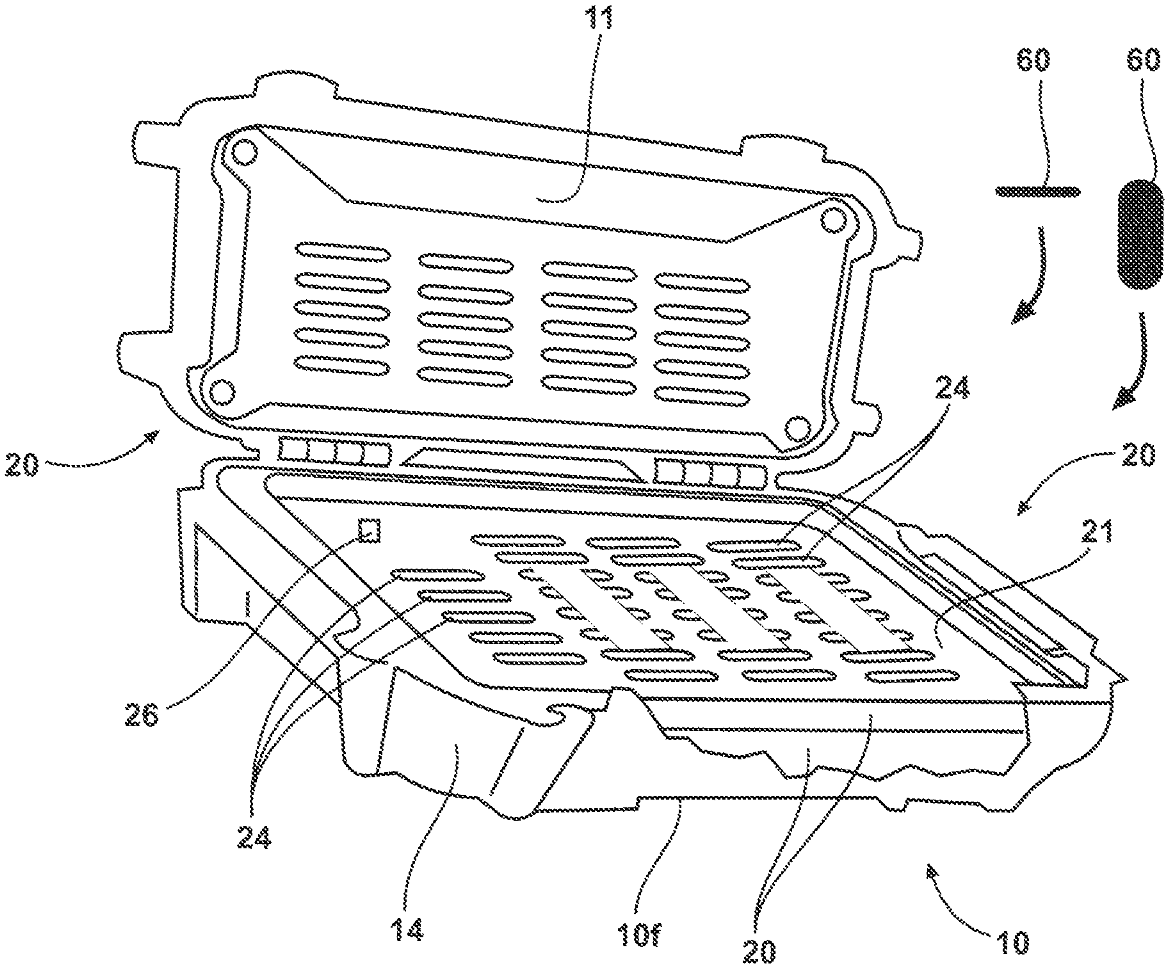
FIG. 1B is a perspective view of a suitcase style tool box according to the present invention, shown partially in cutaway.

Referring to FIG. 1A1, in one embodiment, the invention comprises a tool box 10. While various form factors are feasible, the tool box 10 may be generally parallelepipedally shaped with a top, a bottom opposed thereto, a front, a back opposed thereto, a first lateral side (such as a left side as one faces the tool box 10) and a second lateral side (such as a right side as one faces the tool box 10) opposed thereto. The bottom of the tool box 10 functions as a floor pan 10F to support other items therein. A parallelepipedally shaped tool box 10 may have a constant cross section with a rectangular footprint, although the invention is not so limited, except as specifically claimed. The tool box 10 and trays 20 define mutually perpendicular X, Y and Z axes with the X axis being parallel to the front of the toolbox 10/tray 20, the Y axis being parallel to the depth of the tool box 10/tray 20 and the Z axis being in the vertical or height direction. The tool box 10 may have castors 16, and one or more handles 12 or grips for mobility.

The tool box 10 is adapted to hold tools 60, such as hand tools 60, in a tray 20 and preferably in a plurality of trays 20. The tools 60 are retainable in and accessible from fixed and predetermined positions within the trays 20. Typical hand tools 60 include wrenches, pliers, screw drivers and the like. The particular tools 60 form no part of the claimed invention.

Figure 2:
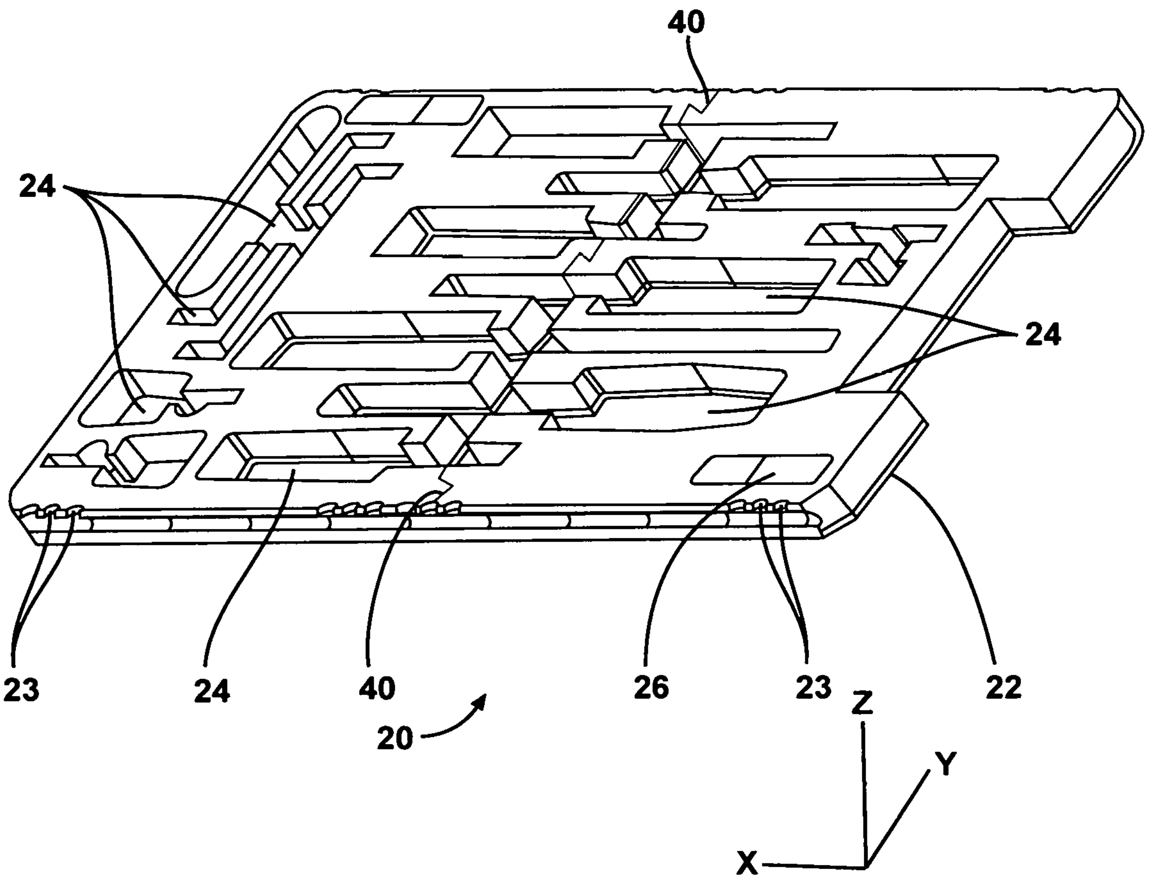

Referring to FIG. 1A2 the tool box 10 may have a selectively reclosable lid 11, such as a hinged lid 11, which may be closed for storage and security. The lid 11 may be opened for access to and replacement of the tools 60. A latch 13 may be used to secure closure and an optional lock may be used for security. The tool box 10 may have plural trays 20 which open by a four bar mechanism as shown or plural trays 20 which are simply vertically stacked one upon another. In either arrangement, the trays 20 may be identically sized or differently sized, as needed. The lid 11 may be domed or otherwise convex for extra storage space.

Inside the tool box 10 is a chamber defining a tool box 10 volume. The chamber is enclosed and defined by a closed end bottom which functions as a floor pan 10F and plural upstanding sidewalls. At the top of the chamber is an opening, preferably and selectively covered by the reclosable lid 11. Substantially all of or a portion of the chamber may include one or more of the trays 20 as discussed below.

Referring to FIG. 1B, the tool box 10 may be split in a suitcase style having a base 14 and lid 11 of similar volumes. Such a tool box 10 may have a hard case, and hold one or more trays 20 in each side. Suitable tool boxes 10 for this embodiment are available in different sizes from Pelican Products, Inc. of Torrance, CA. A size 1510 Pelican case is believed suitable for several uses.

Figure 1C:
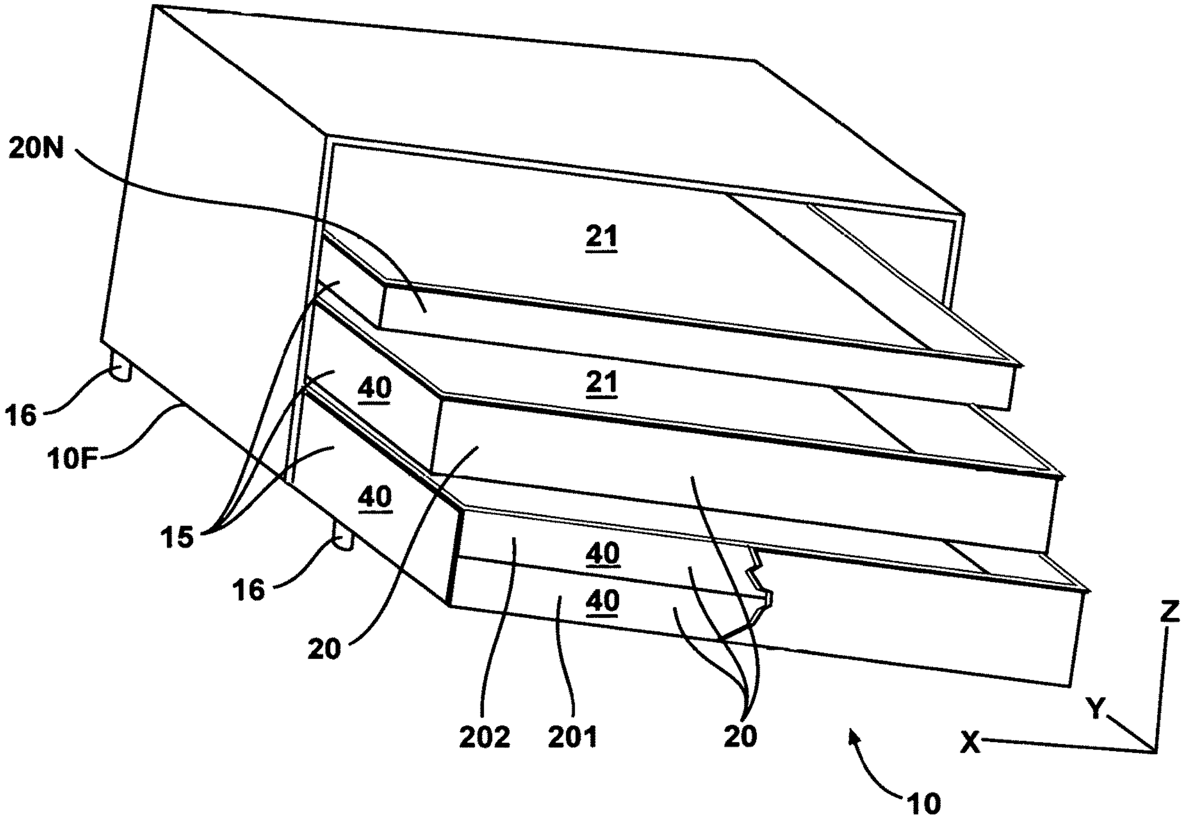
FIG. 1C is a scale perspective view of a tool box according to the present invention having sliding drawers, shown partially in cutaway to reveal two stacked trays in the base.

Referring to FIG. 1C, the tool box 10 may have one or more sliding drawers 15. The drawers 15 can slide on rollers, rails, etc. as is known in the art. Each drawer 15 may hold one or more of the trays 20 according to the present invention.

Referring to FIG. 2, the tray 20 according to the present invention is macroscopically flat, defining an XY plane with a Z direction perpendicular thereto. Each tray 20 has a first surface 21 for receiving the tools 60, and a second surface 22 opposed thereto. In use, the first surface 21 may be generally upwardly facing and the second surface 22 may be generally downwardly facing. The second surface 22 may be generally flat or slightly concave, as desired. The trays 20 may be vertically stacked in the Z direction to take full advantage of the depth of the tool box 10 in the Z direction. The trays 20 may be congruent with and slightly smaller than the footprint and floor pan 10F of the tool box 10 to reduce chatter during transport and facilitate removal in order to access lower trays 20. Optionally, the edges 40 of the tray 20 may have recesses 23 to facilitate gripping.

The trays 20 each have one or more pockets 24. Each pocket 24 is shaped to receive a complementary tool 60 therein. The user places each tool 60 in the complementary pocket 24 for storage until ready for use. The pocket 24 may be congruent with and slightly larger than the tool 60, to provide clearance for placement and retrieval. The pocket 24 may be of constant cross section, with sidewalls generally perpendicular to the first surface 21. Alternatively, the pockets 24 may taper inwardly as the second surface 22 is approached, to facilitate tool 60 nesting and removal.

If desired, the tray 20 may have pockets 24 for larger or heavier tools 60 disposed near the center of the tray 20. Lighter tools 60 or a lower tool 60 density layout may be disposed near the perimeter of the tray 20. This arrangement provides the benefit of stability, reducing the likelihood that one side of the tray 20 will become overloaded and the tool box 10 become unstable.

A tray 20 may have pockets 24 sized and interlaced to provide any reasonable desired density of tools 60 for that tray 20. A nonlimiting and exemplary tray 20 for commonly sized tools 60 may have from 2 to 15 pockets 24 and likely from 5 to 7 pockets 24. A complementary hand tool 60 is preferably disposed in each respective pocket 24 to improve storage density. If desired, for particular projects which do not require a full set of tools 60, one or more predetermined pockets 24 may be left empty to reduce the chance of error.

The trays 20 may be three-D printed using additive manufacturing as is known in the art. This process provides the benefit that the tray 20 is integral and monolithic, reducing the chances of unintended separation that may occur with component parts. A monolithic construction obviates the need for adhesive, improving recyclability.

During the additive manufacturing a dual extruder nozzle is preferably used to provide contrasting colors. The monolithic three-D printing may be performed to provide a first surface 21 of a first color and pockets 24 of a contrasting color. This arrangement can make it easier for the user to identify the right pocket 24 for replacing a particular tool therein. Furthermore contrasting indicia 26 may be three-D printed onto the first surface 21, designating which tool 60 is associated with a particular pocket 24 and/or the order in which the tools 60 are to be used.

The indicia 26 may further designate which tools 60, or subsets thereof, are to be used for a particular project. For example, certain pockets 24 may be marked ABC designating the tools 60 to be used for tasks A, B and C. Other pockets 24 may be marked D and AD, designating the associated tools 60 are to only be used for task D or for tasks A and D, respectively.

Furthermore, by having the tools 60 in the proper pockets 24, inventory becomes easier if a tool 60 is missing. That is, the contrasting indicia 26 identifies the missing tool and, being integral with the three-D printing, will not separate from the first surface 21.

The trays 20 are preferably printed from a material which is hydrophobic, to reduce water retention and contact with the tools 60. Suitable materials for monolithic, integral trays 20 include, but are not limited to, polyolefins, polyvinylchloride, standard PET, PLA, ABS and treated nylons. And by selecting a polymeric tray 20, relatively less friction and wear occur as the tools 60 are removed from and replaced into the pockets 24.

The trays 20 may be vertically stacked in the Z direction to provide a plurality of N trays 20 in a tool box 10 or portion thereof. In such an arrangement, the trays 20 comprise a first tray 201 disposed on the floor pan 10F of the chamber, a second tray 202 disposed on, above and superjacent the first tray 201, etc., to an Nth tray 20N disposed upon all of the other trays 20, which are stacked in superjacent and subjacent relationships.

Each monolithic tray 20 further comprises a plurality of cantilevered posts 30 upstanding in the Z direction. The posts 30 are preferably integral, monolithic posts 30 and cantilevered from a proximal end at the first surface 21 extending outwardly in the Z direction to distal end remote from the proximal end. The posts 30 may have a length in the Z direction from the proximal end to the distal end ranging from 8 mm to 26 mm, and likely from 12 mm to 18 mm. The posts 30 may intercept the second surface 22 of a superjacent tray 20 to space the superjacent tray 20 in the Z direction, facilitating removal of that tray 20 and protecting the first surface 21 of the subjacent tray 20. The integral posts 30 may have various constant or variable cross sections, and combinations thereof, as described below.

Each upstanding post 30 of the N-1 trays 20 may intercept a complementary socket 25 of a tray 20 disposed above and superjacent the first tray 201, whereby the superjacent trays 20 can rest upon the posts 30 of the subjacent trays 20 in succession until the top tray 20 of the plurality of N trays 20 is reached. A single tool box 10 may have from 2 to 15 trays 20, likely from 3 to 8 trays 20 and possibly 5 trays 20.

The top, or Nth, tray 20N of the vertical stack may have upstanding posts 30 which intercept the underside of the lid 11 when the lid 11 is in the closed position. Such a lid 11 may be domed or flat. This arrangement provides the benefit that the Z direction compression of the posts 30 against the lid 11 helps to secure the tray 20 or trays 20 in place within the chamber.

The underside surface 22 of the trays 20 may have sockets 25 disposed therein. The sockets 25 are complementary to and disposed corresponding to upstanding posts 30 on the subjacent tray 20.

Preferably the trays 20 remain mutually parallel when stacked within the chamber of the tool box 10. The trays 20 in a particular tool box 10 may have the same thickness or may have different thicknesses. A single tray 20 may have a variable thickness, so long as the opposing surface 21, 22 of an adjacent tray 20 has a complementary surface 21, 22. For example the first surface 21 of a tray 20 may have a convexly oval shape and the second surface 22 of a superjacent tray 20 may have a complementary concavely oval shape. This geometry provides the benefit that the trays 20 may be secured in place with or without the post 30 and socket 25 arrangement described and claimed herein.

Referring to FIGS. 3A-3D, in a preferred embodiment, the tray 20 may have different numbers of posts 30 and/or different geometries of posts 30. For example, a tray 20 may have a single post 30, projecting in the Z direction from a proximal end at the first surface 21 to a remote distal end. Such a post 30 may be received in a complementary socket 25 of a superjacent tray 20. A single post 30 is feasible for a rectangular or nonrectangular tray 20. This arrangement provides the benefit that one tray 20 may be indexed relative to the next tray 20 in the stack.

Figure 3A:
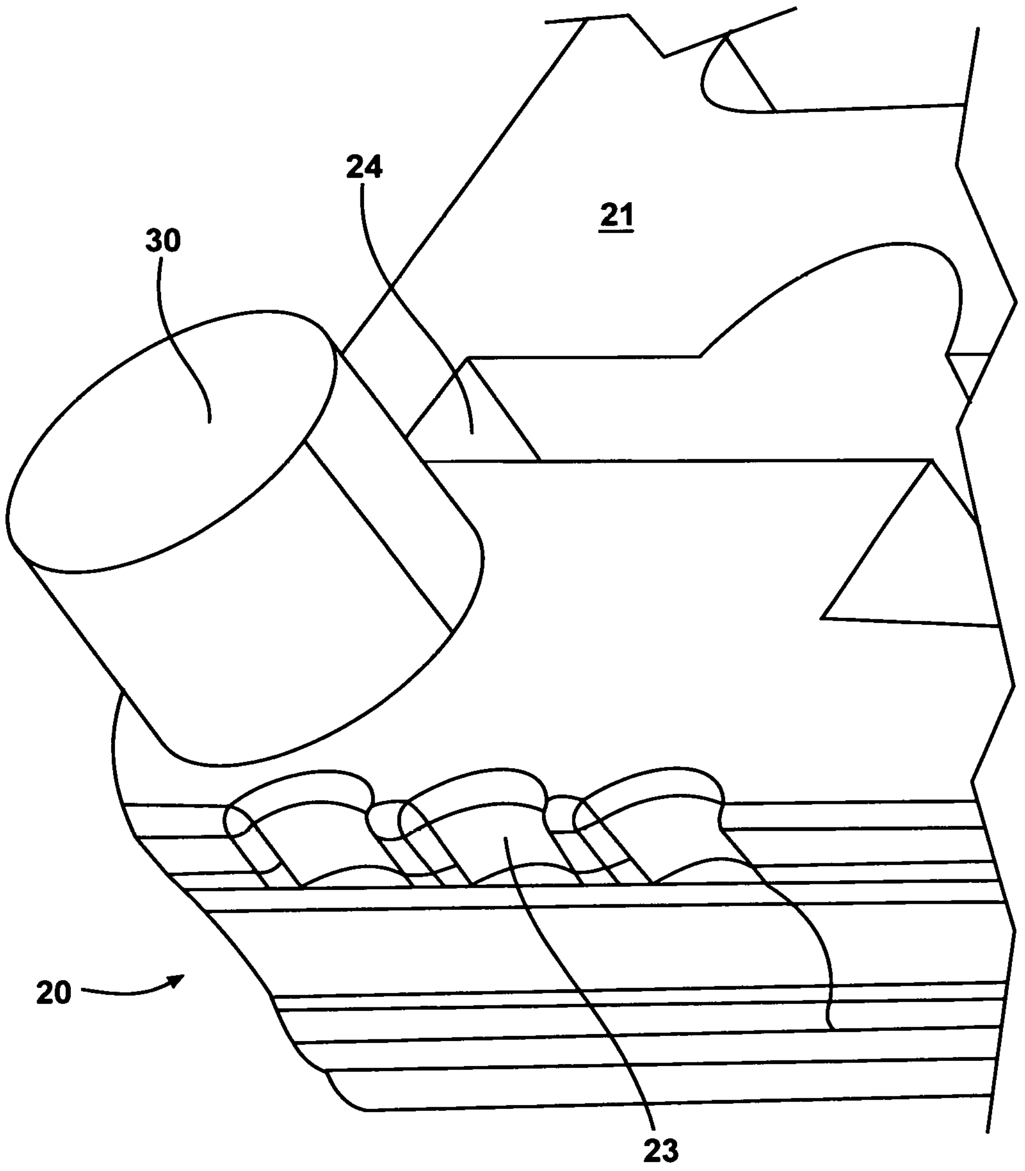
FIG. 3A is a fragmentary perspective view of a cylindrical post for a tray according to the present invention.

Referring to FIG. 3A, the post 30 may have a constant cross section for simplicity and ease of manufacture. This geometry provides the benefit that the posts 30 can be easily inserted into and removed from socket 25, as described below. While a cylindrical post 30 of constant cross section is shown, the invention is no so limited and the post 30 may have a constant cross section which is square, oval, etc.

Figure 3B:
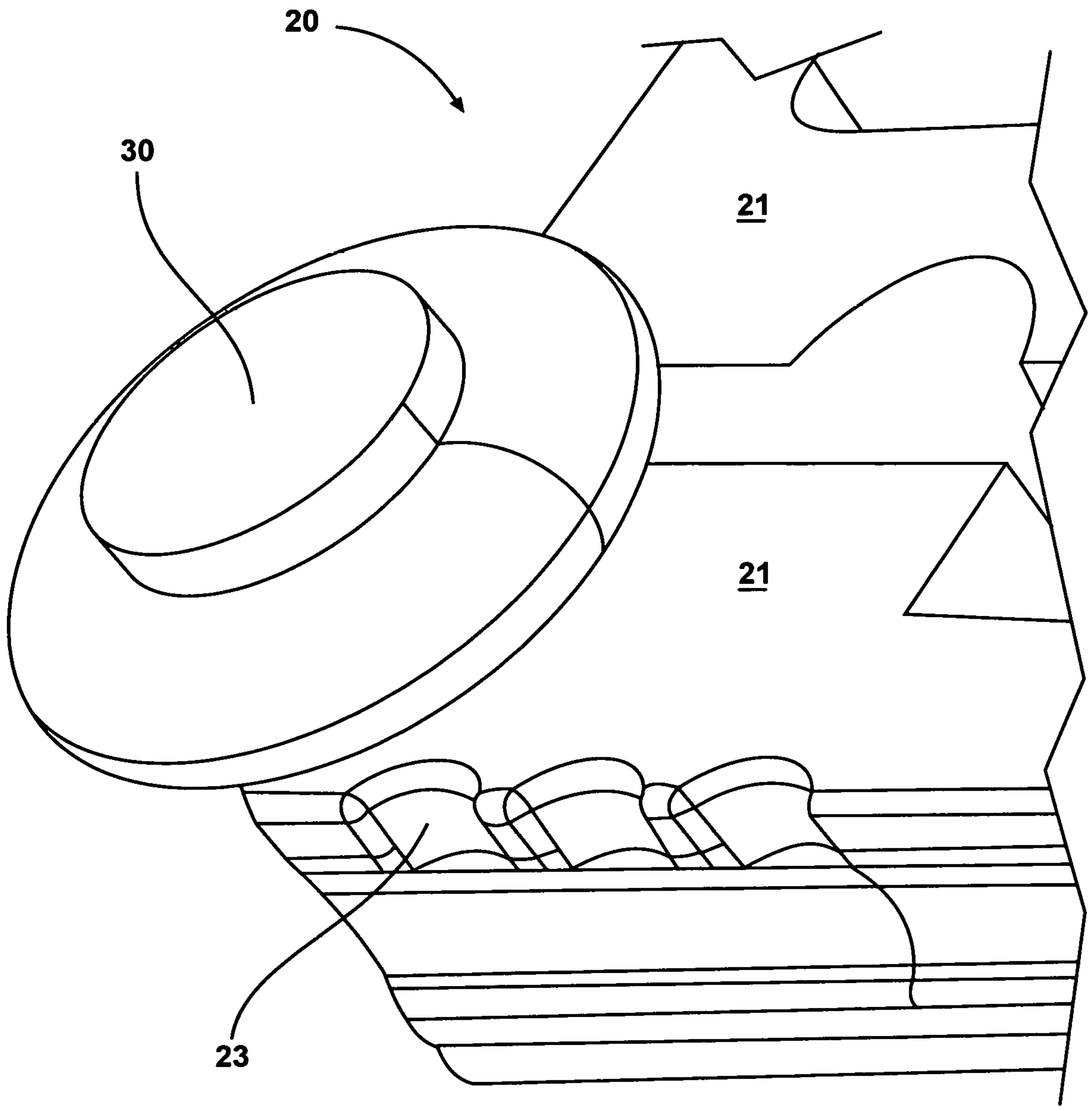
FIG. 3B is a fragmentary perspective view of a convex post for a tray according to the present invention.

Referring to FIG. 3B, the post 30 may be mushroom shaped or hourglass shaped, providing a waist. The waist may have a diameter of 12 mm to 18 mm. This geometry provides the benefit that the post 30 may be ergonomically grasped by the user for manipulation of the tray 20.

Figure 3C:
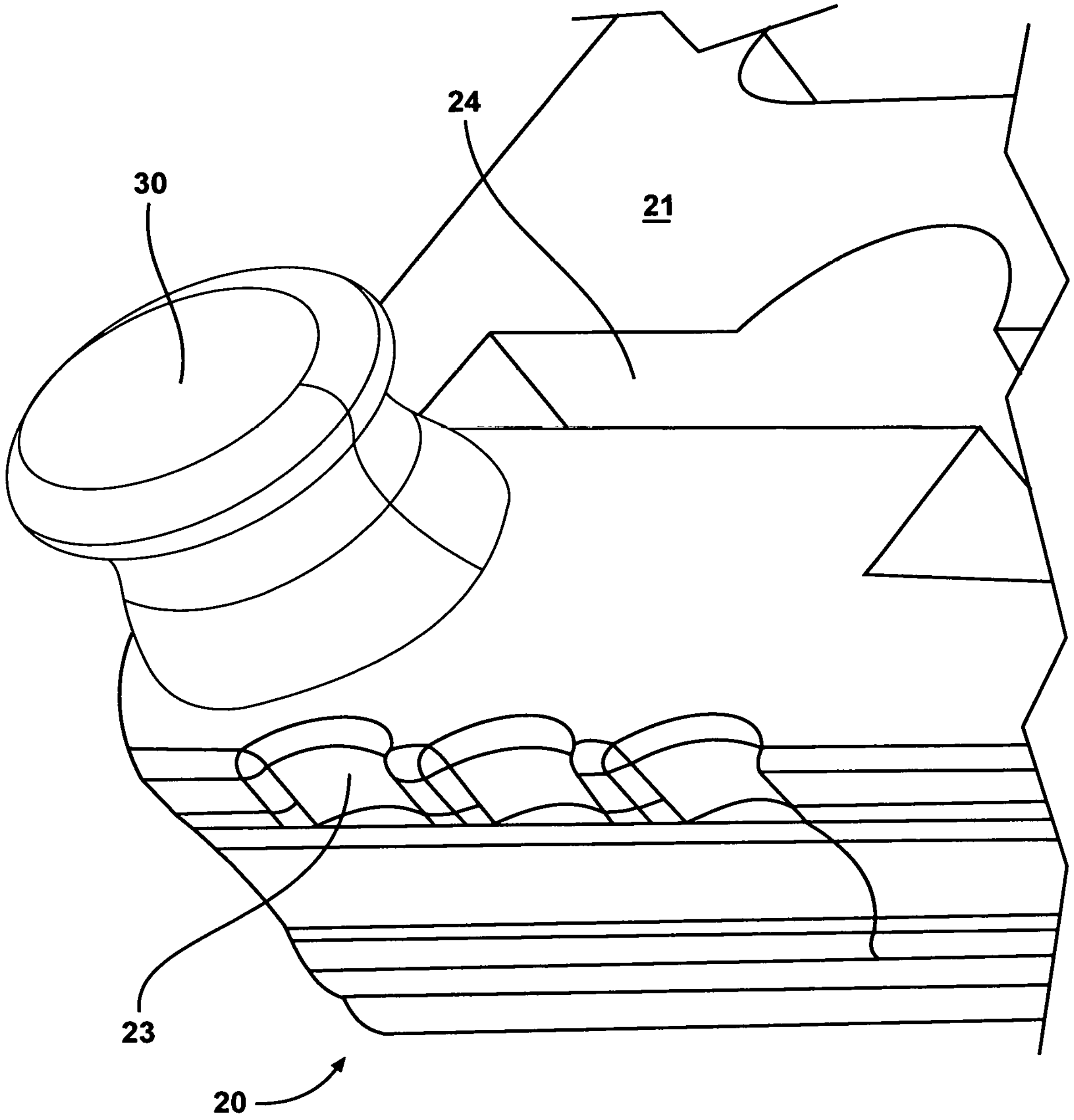
FIG. 3C is a fragmentary perspective view of an hourglass shaped post for a tray according to the present invention.

Referring to FIG. 3C, the post 30 may have an exaggerated barrel shape or resemble a toroid. This shape may be used for a friction fit into the socket 25 of the superjacent tray 20. This geometry provides the benefit that the friction fit prevents undue movement between adjacent trays 20. If the material selected for the post 30 has resiliency, this geometry provides the further benefit of shock absorption between trays 20.

Figure 3D:
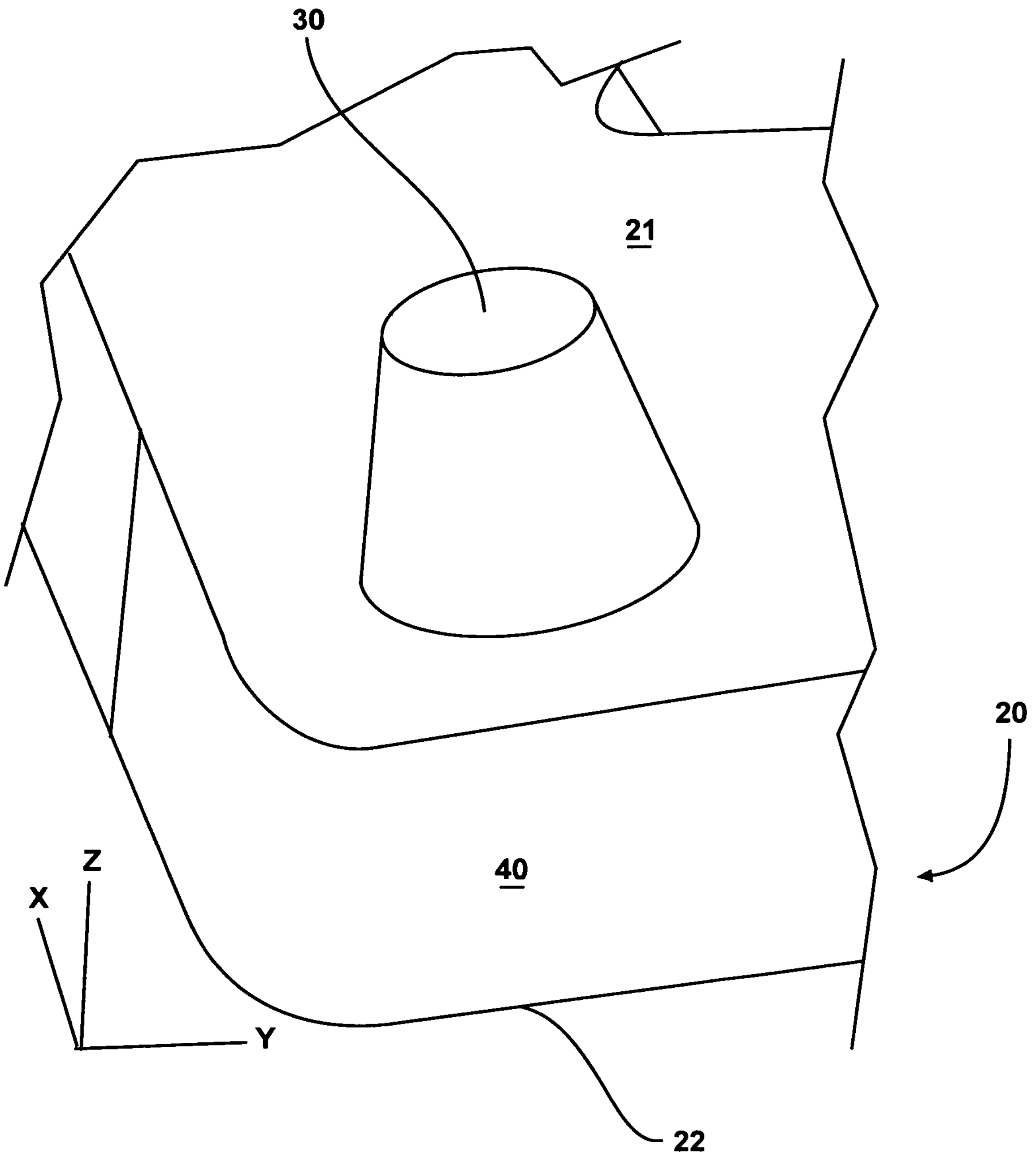
FIG. 3D is a fragmentary perspective view of an frustroconical post for a tray according to the present invention

Referring to FIG. 3D, the post 30 may be frustoconically shaped. Such a post 30 may monotonically taper from a relatively large cross section at the proximal end to a smaller cross section at the distal end. While a circular cross section is shown, the invention is not so limited. The tapered cross section may be oval, square, etc. This geometry provides the benefit that the post 30 is self-centering as it is inserted into the socket 25.

Figure 4:
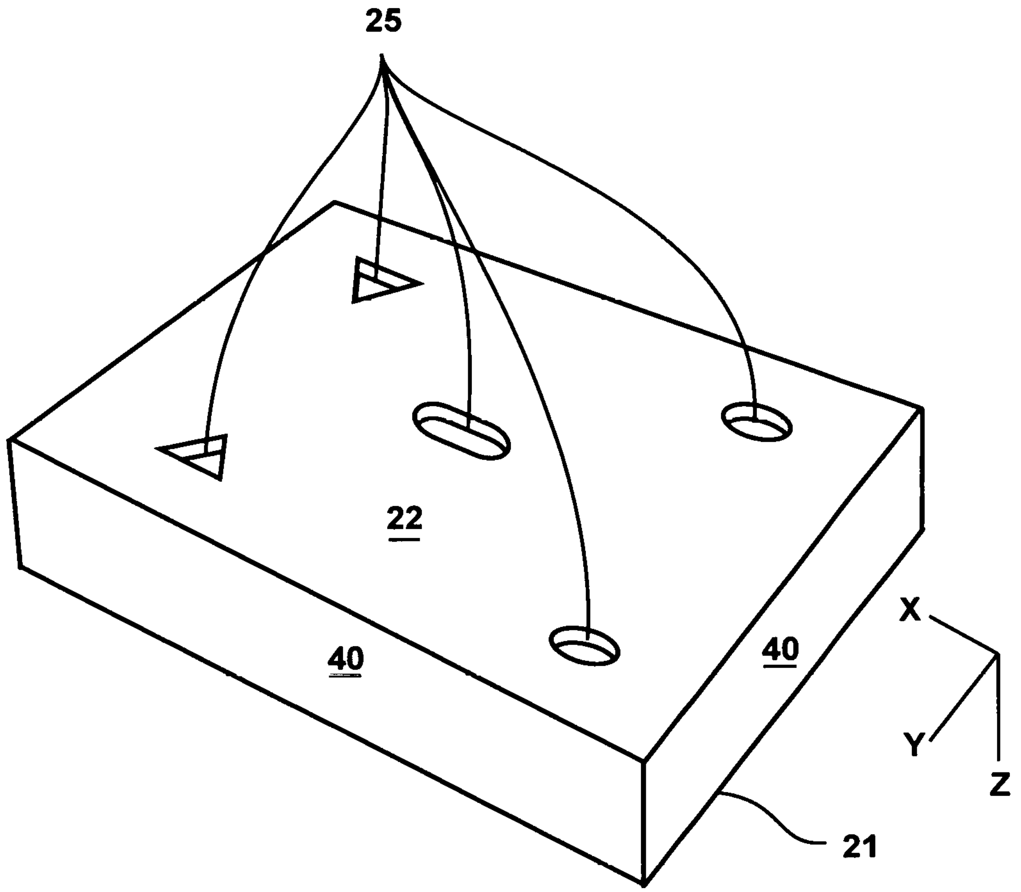
FIG. 4 is a perspective view of the second surface of a tray according to the present invention having sockets for receiving complementary posts from a subjacent tray.

Referring to FIG. 4, as noted above, the second surface 22 of the tray 20 preferably has sockets 25 to receive complementary posts 30 from a subjacent tray 20. This arrangement provides the benefit that the trays 20 are more securely held in place while in the tool box 10. The sockets 25 may have different geometries and/or XY positions to correspond to specific subjacent posts 30.

The subjacent posts 30 may be of differing lengths to provide indexing of one tray relative to the next. One of skill will recognize that the respective socket 25 must be of the appropriate XY position, shape and depth to accommodate the posts 30 having not only differing cross sections but differing lengths as well.

Figure 4A:
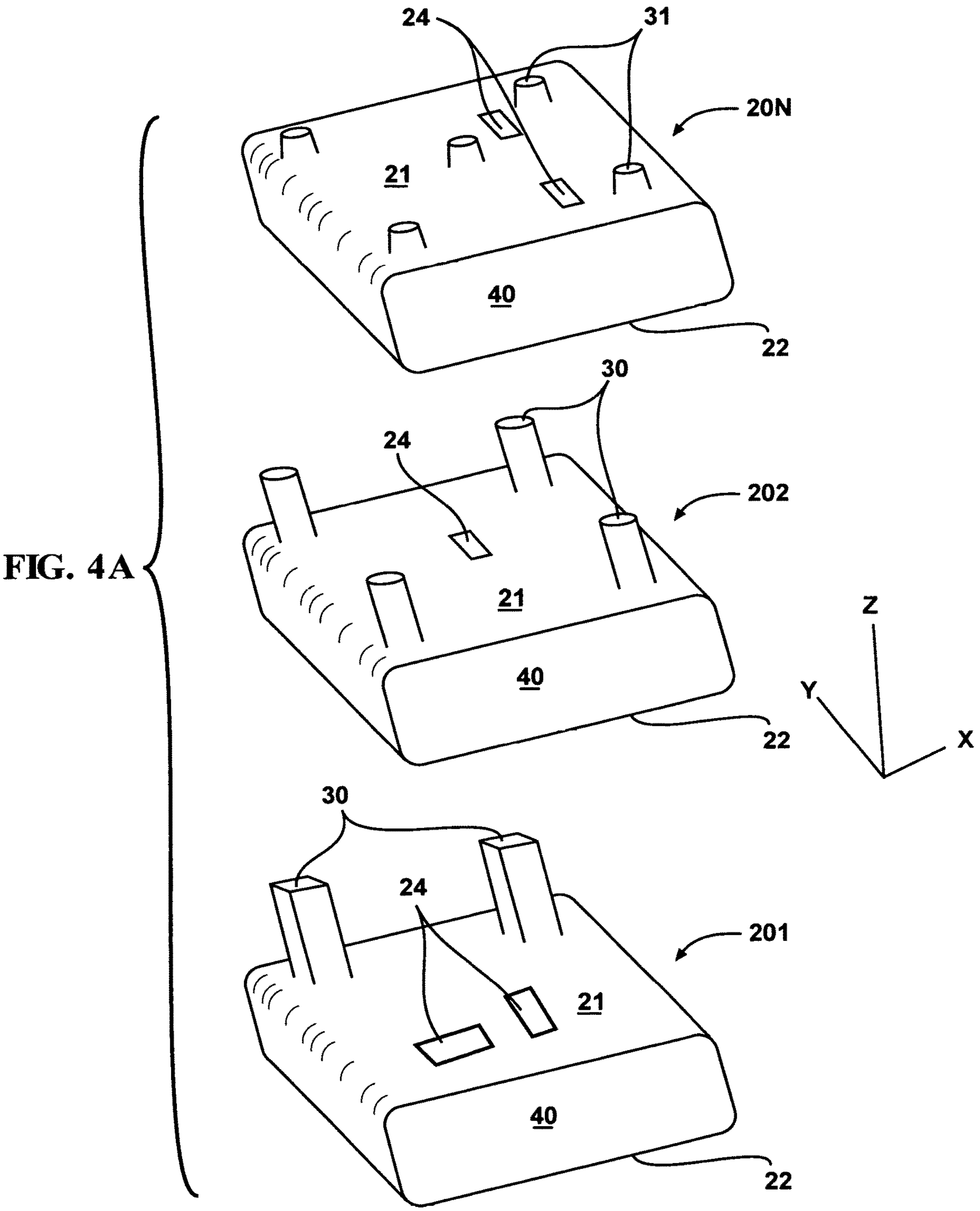
FIG. 4A is an exploded view of superimposable trays, each tray having posts different than the posts of the other trays.

Referring to FIG. 4A, a single tray 20 may have identical posts 30 and sockets 25 or different posts 30 and sockets 25. The four posts 30 on a rectangular tray 20 may be disposed in a congruent rectangular pattern juxtaposed with the corners of the tray 20. Alternatively, the posts 30 and complementary sockets 25 may be disposed in an irregular pattern. For example, posts 30 on adjacent, i.e. non-diagonal, corners of the tray 20 may be mutually different, so that a particular tray 20 can only be disposed in a single configuration relative to the sockets 25 of the subjacent tray 20, This arrangement provides the benefit that a tray 20 may be indexed to the respective subjacent tray 20 through a configuration with corresponding posts 30 and sockets 25. Alternatively, a tray particularly a rectangular tray 20, may have 1, 2, 3, 4, or more identical or different posts 30 disposed in an irregular pattern. This arrangement provides the benefit that vertically stacked trays 20 may be easily indexed by virtually any reasonable number of posts 30.

Thus, different trays 20 may have different respective configurations of posts 30 and sockets 25. By way of non-limiting example, a first tray 201 with large upstanding posts 30 may be disposed on the bottom of the tool box 10. A second tray 202 may be superimposed on the first tray 201, and secured in place with complementary sockets 25. The second tray 202 may have posts 30 smaller than the posts 30 of the first tray 20. A third tray 20 may be superimposed on the second tray 202, with sockets 25 complementary to the posts 30 of the smaller second tray 202. The third tray 20 may have posts 30 smaller than the posts 30 of the second tray 202, and so on. This configuration provides the benefit that successive trays 20 can only be stored and subsequently accessed in the proper order, reducing the chance of error in using the tools One of skill will recognize that any unique configuration of posts 30 for each tray 20 and respective sockets 25 for a superjacent tray 20 will provide a unique vertical stack configuration of the trays 20. In this embodiment there is only a single, unique vertical stack that can occur with a closed lid 11. A predetermined stack configuration of trays 20 reduces the chance of tools 60 being used out of order and a maintenance error occurring.

Figure 4B:
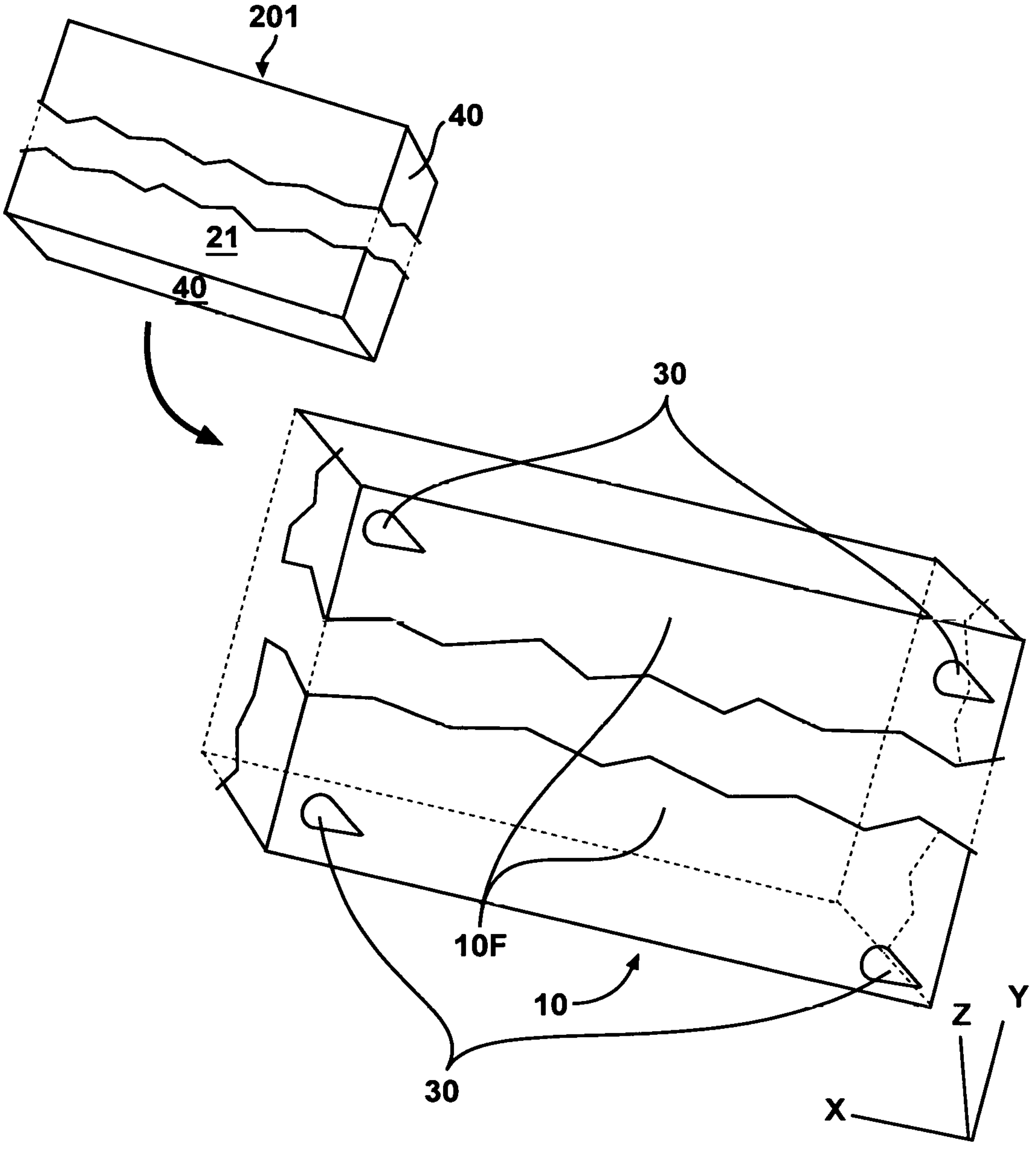
FIG. 4B is a broken exploded schematic, fragmentary perspective view of a tool box having a floor pan of indeterminate Y dimension with upstanding posts and a complementary first tray.

Referring to FIG. 4B, if desired the floor pan 10F of the tool box 10 may have one or more upstanding posts 30. These posts 30 may be seated in complementary sockets of the first tray 201. This arrangement prevent the wrong tray 20 from being selected as the first tray 201 and the trays 20 being loaded out of order.

Combining the embodiments of FIG. 4, FIG. 4A and FIG. 4B, provides a tool box 10 which can only be properly loaded with trays 20 in a single XY configuration and a single Z configuration. The different posts 30 disposed tray 20 to tray 20 provide a single Z direction stack arrangement. The different posts 30 on a single tray 20 provide a single XY orientation. Thus a tool box 10 according to the present invention can only be loaded with tools 60 in one single, predetermined arrangement. This hybrid embodiment provides the benefit that the tool box 10 cannot be loaded with the trays 20 in an unintended or suboptimal manner, further reducing the chance of tools 60 being used out of order and a maintenance error occurring.

Figure 5:
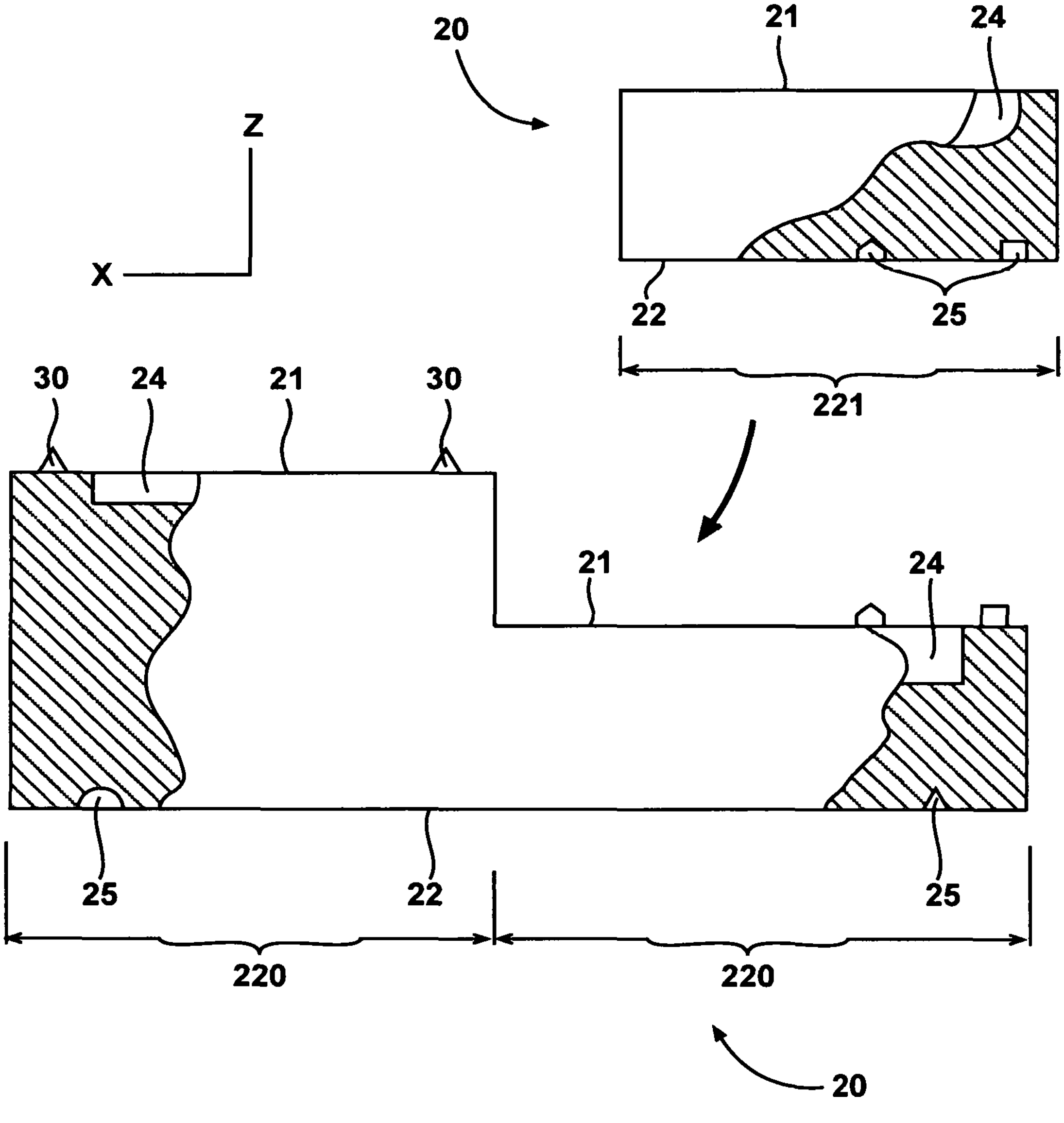
FIG. 5 is an exploded side elevational view shown partially in cutaway of an alternative embodiment of a tray having a dual thickness.

Referring to FIG. 5 in an alternative embodiment, a single tray 20 may have a stepped dual thicknesses 220, 221. This geometry provides the benefit that a first, thicker portion 220 of the tray 20 can accommodate thicker tools 60, while the second, thinner portion 221 of the tray 20 can be used for thinner tools 60. If desired, a third tray 20 having the same footprint as the second, thinner portion 221 of the tray 20 may be superimposed directly onto the second portion 221 of the tray 20 to bring the entire tray to the same thickness and to have a coplanar first surface 21 throughout. This arrangement provides the benefit that more tools 60 can be placed in the same footprint, than would be feasible without the third tray 20, while accommodating tools 60 of plural thickness dimensions. If desired, the tray 20 may have three or more different thicknesses.

Figure 6A:
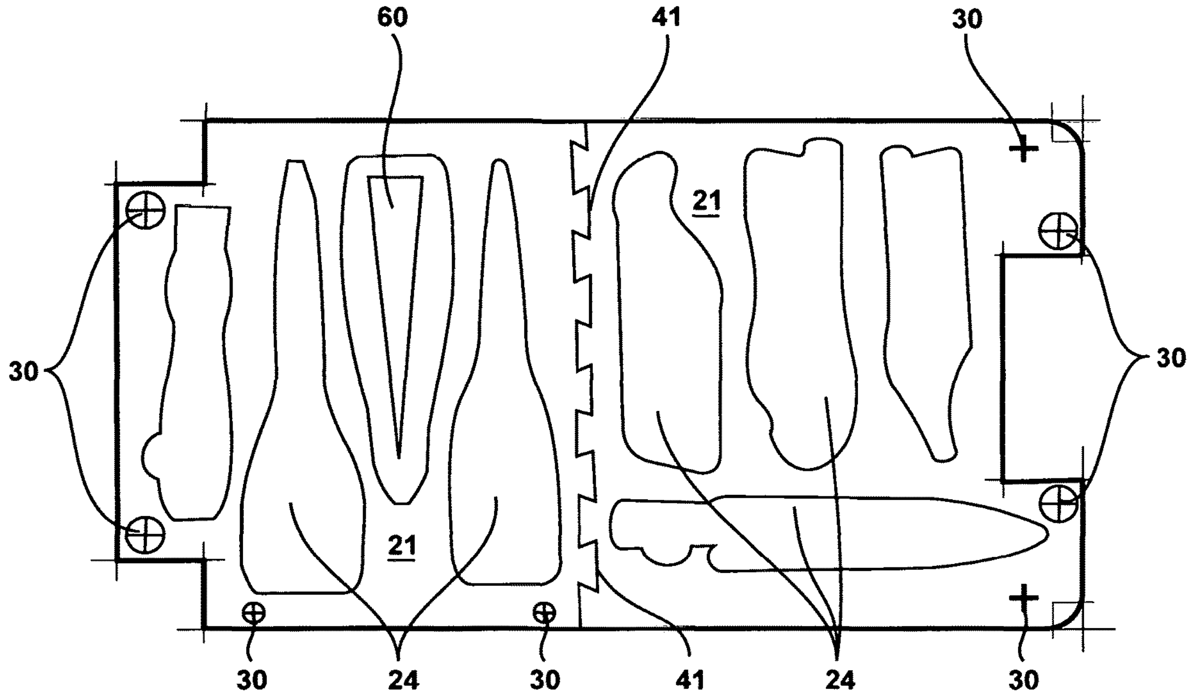
FIG. 6A is a scale top plan view of an alternative embodiment tray having a modular construction and indexed posts, the posts on the left side being spaced further apart than the posts on the right side.

Referring to FIG. 6A, the tray 20 may have an irregular edge 40. In a non-limiting example, the irregular edge 40 may comprise interlocks such dovetails 41 complementary to the interlocks 40 of a corresponding tray 20. This configuration allows for a modular construction whereby a single footprint of the tool box 10 can accommodate plural geometries for the trays 20. For example, a first task may require first and second tool kits. The first and second tool kits are each disposed in respective trays 20. Using the dovetails 41, the first tray 20 and second tray 20 can be locked together (in the XY plane), disposed in and not exceed the footprint of the tool box 10. A second task may require first and third tool kits. Likewise, the first and third tool kits can each be disposed in respective corresponding trays 20. Using the dovetails 41, the first tray 20 and third tray can be locked together (in the XY plane) and disposed in the same tool box 10 for the second project. This modular construction provides the benefit that the modular construction tray 20 can be used for more projects than a fixed construction tray 20.

Figure 6B:
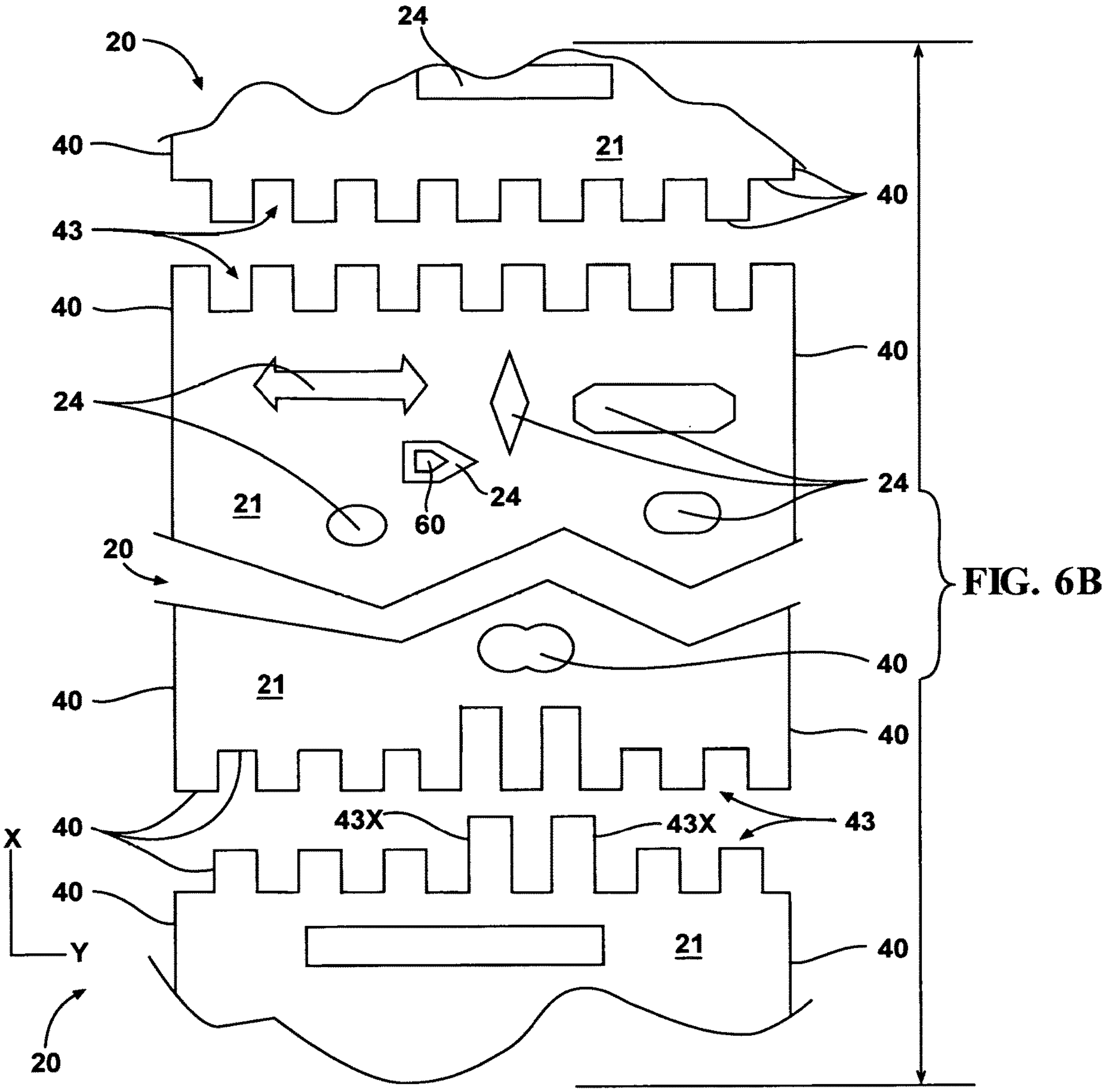
FIG. 6B is a broken fragmentary top plan view of an alternative embodiment of a tray having a modular construction.

Referring to FIG. 6B, a modular tray 20 may have opposed irregular edges 40, such as exemplary, non-limiting square serrations 43. This geometry provides the benefit that three or more modular trays 20 may be disposed in the same tool box 10, providing even more flexibility than the previous embodiment. If desired, the irregular edges 40 may be different on opposed sides of a tray 20, providing a single configuration for installation in the toolbox 10 as needed for a specific project. For example, one or more non-limiting exemplary serrations 43X may be longer, wider, narrower than other serrations 43 so that such serrations 43X only fit into complementary slots. By using two or more interlocked modular trays 20 to fill the footprint of the tool box 10, the user has virtually unlimited options as to the choice of tool 60 selections for various tasks in a single tray 20.

Other variations are feasible. For example the positions of the posts 30 and sockets 25 can be transposed to have the posts 30 extend downwardly from the second surface 22 and the complementary sockets 25 disposed with the pockets 24 on the first surface 21. The posts 30 need not be axisymmetric and may be elongate in the X or Y dimension. In another embodiment, the upstanding posts 30 need not be parallel to the Z direction, but instead may be at an acute angle relative thereto. This embodiment requires slotted complementary sockets 25 to accommodate the angled posts 30.

The invention is only limited by the appended claims and all equivalents thereof. The lower end of any range may be combined with the upper end of any other range for that same parameter. One of skill will recognize that various other modifications and variations are feasible and within the scope of the appended claims.

What is claimed is:

1. A tool box for removably receiving a plurality of hand tools, the tool box comprising:

an enclosed chamber for holding a plurality of hand tools, the enclosed chamber having a bottom functionable as a floor pan and a plurality of upstanding sidewalls extending upwardly therefrom to define an opening at the top of the enclosed chamber;

a lid removably for covering the opening; and a plurality of N monolithic trays, vertically stacked from a bottom monolithic tray to a top monolithic tray, each of the N monolithic trays defining an XY plane at the bottom of the tray with a first surface and a second surface opposed thereto, and defining a Z direction perpendicular thereto, each monolithic tray further having at least one pocket in the first surface being configured to securely receive a complementary hand tool therein, each monolithic tray further comprising at least two posts upstanding in the Z direction and being spaced inwardly of the sidewalls to have a space therebetween and to form an irregular pattern with, each upstanding post intercepting and being received in one of at least two sockets disposed in the second surface of a superjacent tray stacked monolithic tray whereby each superjacent monolithic tray can intercept upon the posts of a subjacent monolithic tray in succession until the top monolithic tray of the plurality of N monolithic trays is reached and that a particular monolithic tray can only be disposed in a single, unique configuration relative to the sockets of the subjacent monolithic tray, whereby each monolithic tray of the plurality of monolithic trays can only be loaded into the stack in a single predetermined XY orientation relative to the other trays in the stack.

2. A tool box according to claim 1 having a flat floor pan with a plurality of posts extending upwardly therefrom and the stacked monolithic trays comprise a bottom monolithic tray disposable on the flat floor pan of the tool box, the bottom monolithic tray having a second surface with a plurality of sockets therein, the sockets being complementary to the plurality of posts extending upwardly from the flat floor pan.

3. A tool box according to claim 2 having a rectangular cross section and a plurality of rectangular monolithic trays stacked therein, each of the rectangular monolithic trays having four spaced apart corners, each rectangular monolithic tray comprising four upstanding posts extending outwardly from the first surface, whereby each upstanding post is juxtaposed with and spaced apart from a respective corner of the rectangular monolithic tray.

4. A tool box according to claim 2 wherein at least two of the upstanding posts on a single monolithic tray have mutually different cross sections and the respective sockets of the superjacent monolithic tray are complementary with the respective posts of the subjacent monolithic tray to be received therein.

5. A tool box according to claim 1 having a constant cross section and a plurality of trays monolithic therein, each monolithic tray of the plurality of monolithic trays having mutually different pockets for receiving complementary mutually different tools therein.

6. A tool box according to claim 5 wherein all of the N trays have four mutually identical upstanding posts and each monolithic tray above a bottom monolithic tray have mutually identical sockets complementary to the four mutually identical upstanding posts.

7. A tool box according to claim 5 wherein each monolithic tray of the plurality of N monolithic trays has a plurality of mutually different upstanding posts and each superjacent monolithic tray has complementary sockets whereby the monolithic trays can only be vertically stacked in the tool box in one Z direction configuration.

8. A tool box according to claim 7 wherein each pocket of each monolithic tray has a complementary hand tool disposed therein.

* * * * *